United States Patent [19]

Morse et al.

[11] 3,998,301
[45] Dec. 21, 1976

[54] METHOD AND COMPOSITION FOR NON-SQUEAL DISC BRAKE PADS

[75] Inventors: Norman Bernard Morse, Newton; David Bruce Lester, Arlington, both of Mass.

[73] Assignee: Norman B. Morse, Newton, Mass.

[22] Filed: Dec. 29, 1975

[21] Appl. No.: 644,847

[52] U.S. Cl. .......................... 188/251 A; 188/73.5
[51] Int. Cl.² ........................................ F16D 69/02
[58] Field of Search .......... 188/73.5, 206 R, 250 G, 188/250 B, 250 R, 251 A, 251 M, 251 B, 255, 256, 257, 258; 192/107 M; 428/443, 445

[56] References Cited

UNITED STATES PATENTS

| | | | |
|---|---|---|---|
| 2,855,329 | 10/1958 | Morton | 188/251 A X |
| 3,130,172 | 4/1964 | Harvey et al. | 188/251 A X |
| 3,684,061 | 8/1972 | Ogawa et al. | 188/73.5 |
| 3,730,920 | 5/1973 | D'Alessandro | 188/251 A X |
| 3,885,651 | 5/1975 | Odier | 188/73.5 |
| 3,916,062 | 10/1975 | Dougherty | 428/443 X |

FOREIGN PATENTS OR APPLICATIONS

1,270,364   4/1972   United Kingdom .............. 188/73.5

Primary Examiner—Duane A. Reger
Attorney, Agent, or Firm—Alfred H. Rosen; Frank A. Steinhilper

[57] ABSTRACT

A system is disclosed for removing squeal or noise from automotive disc brake assemblies. An emulsion of a normally soft polymer together with a cellulosic thickener, an anti-freeze compound, biocide and pigment is coated onto the back side of the outboard pad assembly. When dry the outboard pad assembly is mounted on an automotive disc brake assembly.

2 Claims, 2 Drawing Figures

METHOD AND COMPOSITION FOR NON-SQUEAL DISC BRAKE PADS

STATEMENT OF PROBLEM

It is well known to automobile businessmen and consumers alike, that many disc brakes emit noise or sequeals of various frequencies when utilized. It has been found that the squeal or noise primarily occurs not because of the disc rubbing against the brake pad but instead because the outboard pad assembly is often mounted to float suspended between the disc and disc brake assembly.

The outboard pad assembly consists of a pad material, which makes contact with the disc and a support or mounting member, usually metal, upon which the pad is mounted. The outboard pad assembly upon braking will vibrate between the disc and brake pressure member. This brake pressure member may be the caliper housing or a part mounted internal to the caliper housing.

The vibration emits squeals primarily because the support member is vibrating against the caliper or other internal parts. The vibration between the disc and the pad material contributes insignificantly to the noise problem. Most often the only solution offered by automobile manufactures, parts manufactures and service people is to replace the pad assembly. Although a fresh pad may reduce the possible noise emenating from the vibration between the disc and pad it does not attack the much louder squeal problem due to vibration between the support member and caliper. Normally, after numerous pad changes, service people instruct their customers that squeal is a built in characteristic of disc brakes and cannot be eliminated.

BRIEF SUMMARY OF THE INVENTION

The noise squeal problem has now been solved by damping the member that squeals. This is accomplished in the preferred embodiment by providing a system in which the critical face dampens vibrations. A composition is applied to the outboard pad support member which drys quickly to form a soft flexible film. This composition comprises an emulsion of a normally soft polymer with a cellulosic thickener, a biocide, an anti-freeze compound and a pigment. This composition is allowed to dry on the support member for a few minutes and then the outboard pad assembly is mounted on the disc brake assembly.

DESCRIPTION OF DRAWINGS

Referring now to the drawings.

DESCRIPTION OF INVENTION

Figure 1:
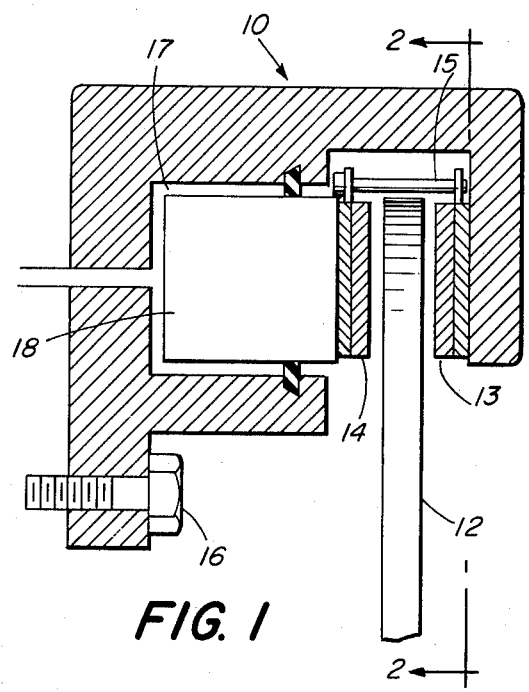
FIG. 1 is a sectioned view of a typical disc brake assembly showing both the inboard and outboard pad assemblies in addition to the rotor, caliper and piston assembly.

Referring now to FIG. 1, the caliper 10 of a disc brake assembly is the housing member to which all parts necessary for disc brake operation is attached with the exception of the disc or rotor. An end view of the brake rotor 12, which is commonly referred to as the disc is shown. The outboard pad assembly 13 contains a pad mounted on a support member. The inboard pad assembly 14, is normally quite similar in size and shape to the outboard pad assembly 13. The outboard pad assembly is secured to the caliper 10 by using bolts 15, which normally secure the inboard pad assembly 14 and outboard pad assembly 13 to the caliper 10. The mounting bolt 16 secures the disc brake assembly to the fixed steering assembly. A hydraulic line 17 is the passageway through which hydraulic fluid enters and moves the piston 18.

Figure 2:
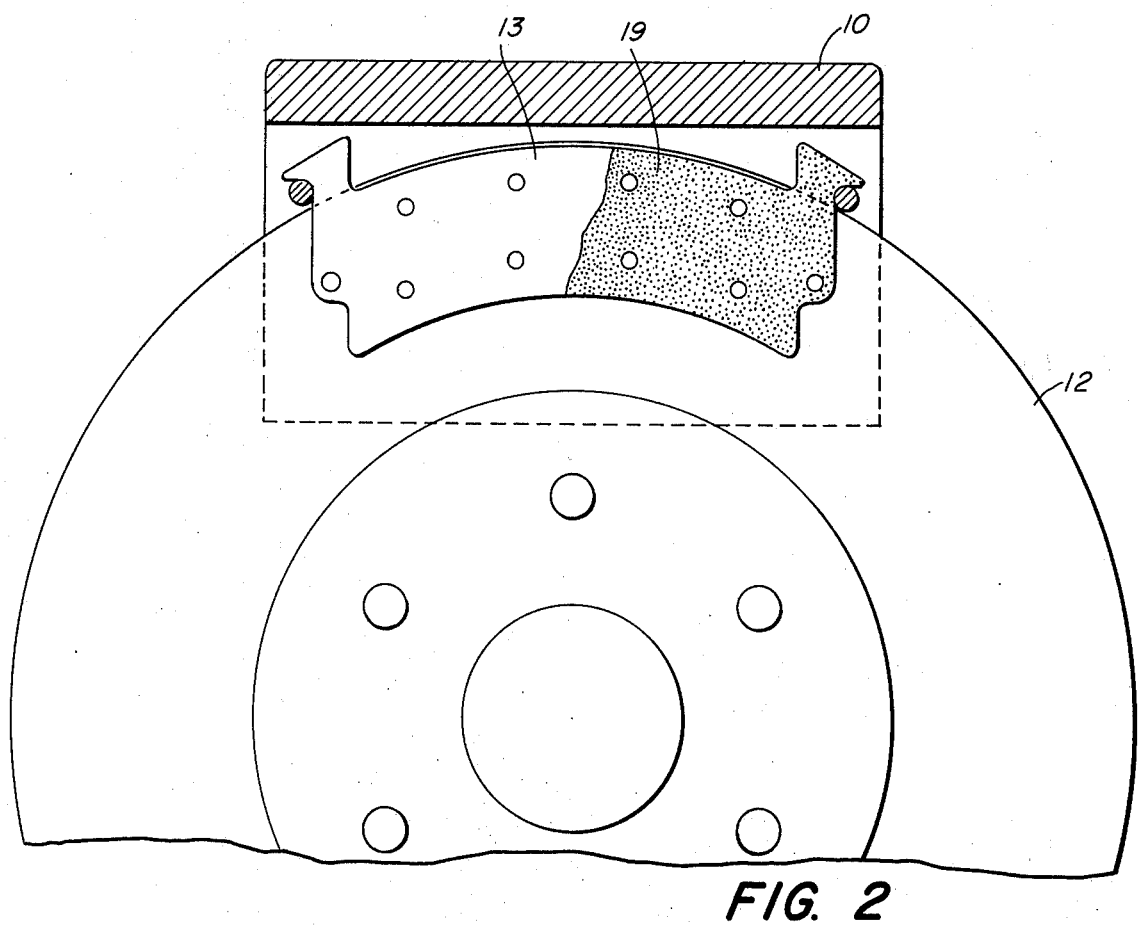
FIG. 2 is a front view of an outboard pad assembly along with the outline of the caliper and rotor, illustrating the coating on the back side of the outboard pad assembly.

In FIG. 2, the outboard pad assembly 13 is more clearly shown with the back surface of the supporting member visible. The caliper 10, and disc 12 are also shown. On the back surface of outboard pad assembly 13 is illustrated the coating of the soft flexible substance, reference numeral 19, which is the essence of my invention.

More specifically, the above referenced composition contains a polymer. One such polymer is styrene butadiene rubber which is a standard synthetic rubber. Any of several water base polymers with acceptable glass transition temperatures would be suitable. Specifically, oil in water emulsions of acrylic and vinyl acetate copolymers, and terpolymers, acrylonitrile rubber, neoprene rubber, ethylene-vinyl acetate polymers, polyurethane elastomers would be acceptable. A dry film which softens as measured by its glass transition temperature in the range $-40°$ C to plus $20°$ C is preferred to insure effective damping of the vibrations. Its preferable to have between 40% and 70% of the polymer emulsion to be solids. A composition with too low a solids content will not cover the surface as well as the preferred composition, and too high a solids content yields a composition which is difficult to spread.

A cellulosic thickener is used in the composition to create a paste-like consistency to the composition. It is desirable to obtain this paste-like consistency for the purpose of ease of application by the operator. In the preferred embodiment a Hydroxy ethyl cellulose which is a hydrophilic cellulose derivative is the thickener utilized. To achieve the recommended consistency 2–4% by weight of hydroxy ethyl cellulose should be added. Other thickeners can be used, and in particular other hydrophilic cellulosic thickeners such as, for example, carboxy methyl cellulose are useful.

Ethylene glycol, a conventional anti-freeze may be added as a freeze-thaw resistant to insure that the composition reaches the user in a stable usable condition. Although ethylene glycol is presently preferred, the same freeze-thaw resistance may be obtained with propylene glycol or a non-ionic surfactent. The composition also includes a biocide to keep destructive bacteria and other causes of decay or deterioration at minimum development. Essentially any biocide that kills off bacteria and mixes with the composition is satisfactory. In the preferred embodiment a product sold by Dow Chemical, Dowicil 75 was utilized. An amount in the area of 0.2 parts by weight is sufficient to prevent bacterial growth.

A pigment is included in the composition, typically a thalo blue, which is water dispersible for cosmetic as well as application reasons. The pigments provides the operator applying the composition a method of determining the areas already covered and the thickness of the composition on the covered areas. Although the color blue is preferred, any color sufficient to accomplish the above stated purposes is adequate.

This composition is used by applying a smooth coating to the back surface of the outboard pad assembly. Once the coating is applied, it is allowed to dry for a short period of time. After the coating has dried, the outboard disc pad is mounted in the disc brake assembly in the usual manner. The composition can be applied to the pad by the manufacturer and retains its effectiveness for many months, but for convenience of shipping it is often preferred that the coating operation be carried out by the mechanic who actually installs the pad on the automobile.

I have found that when the composition is applied in this manner, it reduces squeal emanating from disc brake assemblies.

Therefore, I claim:

1. A non-squeal automobile replaceable disc brake pad assembly comprising:
   a mounting member adapted to fit an automobile braking system and for mounting against a brake pressure member of said braking system;
   a first surface of said mounting member being positionable against said brake pressure member,
   a coating on said first surface of a soft film polymeric emulsion having a glass transition temperature between the range of about −40° C and about +20° C; and
   a brake pad integrally mounted on one surface of said mounting member to face away from said brake pressure member and to be pressed against a rotating disc braking member.

2. A method of reducing squeal in automotive disc brakes wherein said brakes include a brake pad integrally mounted on a rigid support member, said support member being replaceably mounted against a brake pressure member on automobile braking systems to be pressed releasably against a rotating disc member and said support member, comprising;
   coating the surface of said support member at least on the surface positioned against said brake pressure member with a permanently tacky polymeric rubber emulsion which, when dry, has a glass transition temperature ranging between about −40° C and about +20° C,
   drying said coating; and
   mounting said pad and its integrally mounted support member on a brake pressure member of an automobile braking system.

* * * * *